(12) United States Patent
Tucker et al.

(10) Patent No.: US 7,443,301 B2
(45) Date of Patent: Oct. 28, 2008

(54) LONG RANGE RFID TRANSPONDER

(75) Inventors: Randall L. Tucker, Findlay, OH (US); Gary T. Carroll, Louisville, CO (US)

(73) Assignee: Cooper Tire & Rubber Co., Findlay, OH (US)

( * ) Notice: Subject to any disclaimer, the term of this patent is extended or adjusted under 35 U.S.C. 154(b) by 7 days.

(21) Appl. No.: 11/787,640

(22) Filed: Apr. 17, 2007

(65) Prior Publication Data

US 2007/0285244 A1 Dec. 13, 2007

Related U.S. Application Data

(60) Provisional application No. 60/796,037, filed on Apr. 28, 2006.

(51) Int. Cl.
*G08B 23/00* (2006.01)
*G01M 17/00* (2006.01)

(52) U.S. Cl. .................... 340/572.8; 701/32

(58) Field of Classification Search ... 340/572.1–572.8, 340/442–449, 933, 941, 10.1, 10.34; 73/146, 73/32; 310/26
See application file for complete search history.

(56) References Cited

U.S. PATENT DOCUMENTS

| | | |
|---|---|---|
| 3,815,651 A | 6/1974 | Neal |
| 3,986,916 A | 10/1976 | Marangoni |
| 3,994,653 A | 11/1976 | Marangoni |
| 4,036,667 A | 7/1977 | Simon |
| 4,067,235 A | 1/1978 | Markland et al. |
| 4,074,227 A | 2/1978 | Kalmus |
| 4,160,234 A | 7/1979 | Karbo et al. |
| 4,695,823 A | 9/1987 | Vernon |
| 4,862,486 A | 8/1989 | Wing et al. |
| 4,911,217 A | 3/1990 | Dunn et al. |
| 5,011,379 A | 4/1991 | Hashimoto |
| 5,083,457 A | 1/1992 | Schultz |
| 5,218,861 A | 6/1993 | Brown et al. |
| 5,231,872 A | 8/1993 | Bowler et al. |
| 5,319,354 A | 6/1994 | Myatt |
| 5,346,663 A | 9/1994 | Sigenthaler |
| 5,348,067 A | 9/1994 | Myatt |
| 5,472,372 A | 12/1995 | Marangoni |
| 5,483,827 A | 1/1996 | Kulka et al. |
| 5,500,065 A | 3/1996 | Koch et al. |
| 5,505,080 A | 4/1996 | McGhee |

(Continued)

FOREIGN PATENT DOCUMENTS

WO  WO 2005/022726 A1  3/2005

OTHER PUBLICATIONS microID™ 13.56 MHz RFID System Design Guide; Microchip; 1999 Microchip Technology, Inc.; Jul. 1999/DS21299C.

(Continued)

*Primary Examiner*—Jeff Hofsass
*Assistant Examiner*—Sigmund Tang
(74) *Attorney, Agent, or Firm*—Emch, Schaffer, Schaub & Porcello, Co., L.P.A.

(57) ABSTRACT

A radio frequency identification device includes a piezo-electric crystal and a passive magnetic field sensor having magnetostrictive material. The sensor is responsive to a magnetic field to displace piezo-electric material to thereby generate electricity to power the device.

10 Claims, 5 Drawing Sheets

U.S. PATENT DOCUMENTS

| | | | |
|---|---|---|---|
| 5,540,092 A | 7/1996 | Handfield et al. |
| 5,562,787 A | 10/1996 | Koch et al. |
| 5,573,610 A | 11/1996 | Koch et al. |
| 5,573,611 A | 11/1996 | Koch et al. |
| 5,585,554 A | 12/1996 | Handfield et al. |
| 5,694,111 A | 12/1997 | Huang |
| 5,701,043 A | 12/1997 | Razzaghi |
| 5,731,516 A | 3/1998 | Handfield et al. |
| 5,731,750 A | 3/1998 | Tatomir et al. |
| 5,731,751 A | 3/1998 | Vangala |
| 5,731,754 A | 3/1998 | Lee, Jr. et al. |
| 5,741,966 A | 4/1998 | Handfield et al. |
| 5,781,104 A | 7/1998 | Huang |
| 5,798,689 A | 8/1998 | Huang |
| 5,825,283 A | 10/1998 | Camhi |
| 5,825,286 A | 10/1998 | Coulthard |
| 5,883,569 A | 3/1999 | Kolefas |
| 5,969,608 A | 10/1999 | Sojdehei et al. |
| 5,977,870 A | 11/1999 | Rensel et al. |
| 6,028,525 A | 2/2000 | Shukla et al. |
| 6,087,930 A | 7/2000 | Kulka et al. |
| 6,147,659 A | 11/2000 | Takahashi et al. |
| 6,204,765 B1 | 3/2001 | Brady et al. |
| 6,208,244 B1 | 3/2001 | Wilson et al. |
| 6,237,403 B1 | 5/2001 | Oldenettel et al. |
| 6,257,289 B1 | 7/2001 | Tomita et al. |
| 6,304,176 B1 | 10/2001 | Discenzo |
| 6,437,558 B2 | 8/2002 | Li et al. |
| 6,439,063 B1 | 8/2002 | Schnackenberg |
| 6,441,731 B1 | 8/2002 | Hess |
| 6,580,363 B1 | 6/2003 | Wilson |
| 6,581,449 B1 | 6/2003 | Brown et al. |
| 6,687,293 B1 | 2/2004 | Loyer et al. |
| 6,693,541 B2 | 2/2004 | Egbert |
| 6,700,567 B1 | 3/2004 | Jaeger et al. |
| 6,700,931 B1 | 3/2004 | Lee et al. |
| 6,705,365 B1 | 3/2004 | Wilson |
| 6,725,713 B2 | 4/2004 | Adamson et al. |
| 6,737,965 B2 | 5/2004 | Okubo |
| 6,771,170 B2 | 8/2004 | Papallo, Jr. et al. |
| 6,788,192 B2 | 9/2004 | Shimura |
| 6,791,457 B2 | 9/2004 | Shimura |
| 6,809,515 B1 | 10/2004 | Li et al. |
| 6,809,516 B1 | 10/2004 | Li et al. |
| 6,825,758 B1 | 11/2004 | Laitsaari |
| 6,843,113 B2 | 1/2005 | Lin |
| 6,856,245 B2 | 2/2005 | Smith et al. |
| 6,885,291 B1 | 4/2005 | Pollack et al. |
| 6,897,770 B2 | 5/2005 | Lill |
| 6,899,153 B1 | 5/2005 | Pollack et al. |
| 6,984,902 B1 * | 1/2006 | Huang et al. ................. 310/26 |
| 2002/0050744 A1 | 5/2002 | Bernstein et al. |
| 2004/0191346 A1 | 9/2004 | Marangoni et al. |
| 2005/0073435 A1 * | 4/2005 | Voeller et al. ................ 340/933 |

OTHER PUBLICATIONS

Atmel; 13.56 MHZ, 2048-bit RFID EEPROM; AT88RF020; Feb. 2006.

* cited by examiner

LONG RANGE RFID TRANSPONDER

CROSS REFERENCE

The present application is based on and claims the benefit of U.S. Provisional Application No. 60/796,037 filed Apr. 28, 2006.

BACKGROUND OF THE INVENTION

In the manufacture and use of tires, it is desirable to know a definitive serial number of a tire to provide a means for the correlation of beneficial data and to gather data regarding the tires such as air pressure, wear and miles of travel.

FIELD OF THE INVENTION

The present invention relates to a Long Range Radio Frequency Identification device (RFID). More particularly, the present invention relates to an RFID device permanently embedded or temporarily mounted in a tire or other goods during or after manufacture. When used with tires, the RFID device may identify and record mileage and other data in tires of all sizes. Copending application Ser. No. 11/408,466 filed Apr. 20, 2006, which is owned by the assignee of the present application, discloses procedures under which an RFID transmitter housed in a tag or chip is cured directly into the tire to provide a tamper-proof system for permanent identification. It is positioned at a fixed radial location in the tire during manufacture.

Under the present invention there is provided a new RFID chip design having long-range transmission capability of information contained therein. The information contained in the RFID chip may include the serial number, SKU or EPC code, date of manufacture and other information which may be utilized for the sorting and sequencing for additional manufacturing processes and warehousing. In use following mounting on a vehicle, it also has the capability of generating new information regarding the tire such as the number of revolutions by sensing the earth's magnetic field. The long range capability permits the user to access information regarding tires or other goods in which it is implanted or applied to. For example, it can track goods in a warehouse in order to maintain inventory control.

The RFID device of the present invention utilizes a pulsing of the magneto-restrictive material for generating electromagnetic power internally of sufficient strength to provide long range transmission of an RF signal for example, sufficient to access such RFID chip throughout a warehouse. Tests conducted on the RFID chip of the present invention have shown that data can be retrieved therefrom by an RFID reader located as far as 30 feet from the goods having such RFID chip implanted therein. Goods in warehouses much larger than 100 feet in any direction can be 100% read simply by positioning a plurality of RFID readers throughout the warehouse such that each of the goods with the RFID tag is no more than 30 feet from an RFID reader. Further improvements to the RFID tag could, of course, extend the distance from which it could be read.

Prior art passive RFID tag or chip technology utilizes electromagnetic power received from the querying device to power the circuit and enable it to transmit the RF signal back to an RFID reader. This return signal carries the bit stream that contains the identification number and other information. Such prior art technology has a limited range due to the limitation of the power transfer between the querying unit (i.e. RFID reader) and the tag.

The new RFID device of the present invention generates its power from a PME (Passive Magnetostrictive Electroactive) device or similar devices. For example a passive magnetic field sensor made of layers of Terfenol-D {Fe2(Dy0.7Tb0.3)} magnetostrictive material and ceramic PZT-5 will act as a generator to power the RFID when in range of the querying transceiver magnetic field of (0.3 Oersted or larger). The Magnetostrictive material or other material stretches flexes or physically displaces the piezo or other power generating materials in the presence of a magnetic field or pulsed magnetic field, generating the power for the RFID chip. When the power is generated it maybe used directly or stored in a battery, capacitor or other power storage device. When it achieves a predetermined level of 1 to 5 volts, the power is available to the transmitter which transmits the signal to the reader. This will obviate the need of prior art devices of providing RF signals to initiate and power the RFID tag in order to transmit back to the querying unit's receiver. The new PME harvester/sensor RFID tag will generate pulses of power with each query. These pulses will power the RF chip and the long range transmitter of the RFID tag of the present invention thereby providing for long range RFID transmission capability from a passive/active RFID tag.

One type of passive magnetic magnetostrictive electroactive device is a vibration energy harvester sold by Ferro Solutions, Inc., Cambridge, Mass. which is believed to incorporate features described in U.S. Pat. No. 6,984,902. A patent which discloses the use of piezoelectric materials for generating power from a rotating tire includes U.S. Pat. No. 6,725,713.

The querying devices consist of an electromagnetic generating circuit to query the tag and a RF receiver to communicate with the tag.

The querying device sends out an electromagnetic field that is picked up by the RFID tag and used as the power source.

The RFID tag will use the PME device to capture this power and energize the circuitry within the tag. The RFID tag can use the RF frequency of this field as its internal clock and thereby be in total synchronism with the querying device or it may have its own internal clock.

Under the prior art RFID tags, the power is provided by a coil that is used to pick up the electromagnetic field in the same manner as a secondary of a transformer would operate. The RFID tag or transponder of the present invention has a design which does not operate as a transformer but instead takes the electromagnetic energy and creates energy by the PME or similar device that powers the transmitter.

Under the present invention, there is also provided a magnetic sensor to record the rotational count of a tire. This is accomplished by monitoring the output of the magnetic sensor through a comparator circuit and conditioning the signal. The circuit provides an output on a positive or negative leading or trailing edge of the signal, which indicates a rotation of the tire or sensor within the earth's magnetic field. The system then records the counts (i.e. the number of rotations) which can then be accessed by reading the RFID data. One benefit of the RFID device is that it will provide an accurate mileage indication, which could be used for improving a tire design or warranty issues.

A benefit of the long-range transmission of the serial number of the tires is that it permits sorting and sequencing of the tires in subsequent processes of warehousing, sorting and shipping. The long-range transmission capability of the RFID device of the present invention permits the reading of skid-load quantities of tires in the warehousing and shipping operations as well as reading information regarding a specific tire.

The RFID tag of the present invention is provided with the ability to be turned on and off. It is possible to turn off or deactivate the long-range transmission feature of the RFID tag while leaving on the ability of the tag to be detected and provide information to a scanner reader. The ability to be turned partially or completely off reduces power consumption and thereby extends the life of the RFID device over that of a similar device not having this feature.

With respect to the feature of being turned on and off by activation from a location remote from the tag, all transponders such as the RFID tag of the present invention can awaken from sleep when they receive a low frequency electromagnetic pulse, typically at 125 kHz. This electromagnetic pulse is created by an RFID reader that is tethered to a computer. The computer will control one or more readers and collect all of the data received by the readers. The reader will have a large antenna coil that can radiate an electromagnetic field large enough to wake up multiple transponders (RFID chips) at a time. For example, the antenna could be in the range of 24 to 48 inches in diameter and be driven with up to 25 watts of power. The reader could generate energy in the 125 kHz spectrum.

Each RFID tag/transponder will be awakened from sleep and then generate a random number that represents a time slot to send back its data to the reader in order to not collide with data of other transponders or it could use a more conventional anti-collision scheme. In order to selectively poll groups of RFID tag/transponders, the computer will command the reader(s) to send out an encoded electromagnetic string of pulses that will wake up the transponders as well as identify which group of transponders it wants to respond. The process will work as follows: 1) A single pulse without any follow-on pulses for a period of three data bits will wake up all transponders within the antenna's field. Each transponder will wake up, wait three pulse widths worth of time and if no additional pulses appear, then continue on with the anti-collision random time slot generation and then transmit their data in their unique time slot. 2) A single wake up pulse is given. Then immediately afterwards, a group code will cause the transponders to compare the group code to their internally programmed group code. Only those transponders with a matching code will respond and all others without a matching code will not transmit a code and go back to sleep.

Another mode of a non-matching coded device would be to retransmit the requested data to echo the original request, thus generating a mesh network of devices.

Another feature which contributes to a long life for the RFID tag or transponder of the present invention is the feature of minimal power consumption through use of a microcontroller which operates in the range of two micro amps or possibly at 2 nanoamps, depending on part manufacturer. The conversion of the earth's magnetic field or a pulsed magnetic field into electrical energy by means of the previously discussed piezoelectric magnetostrictive feature also assists in providing an RFID tag with long life.

DETAILED DESCRIPTION OF THE INVENTION

Figure 1:
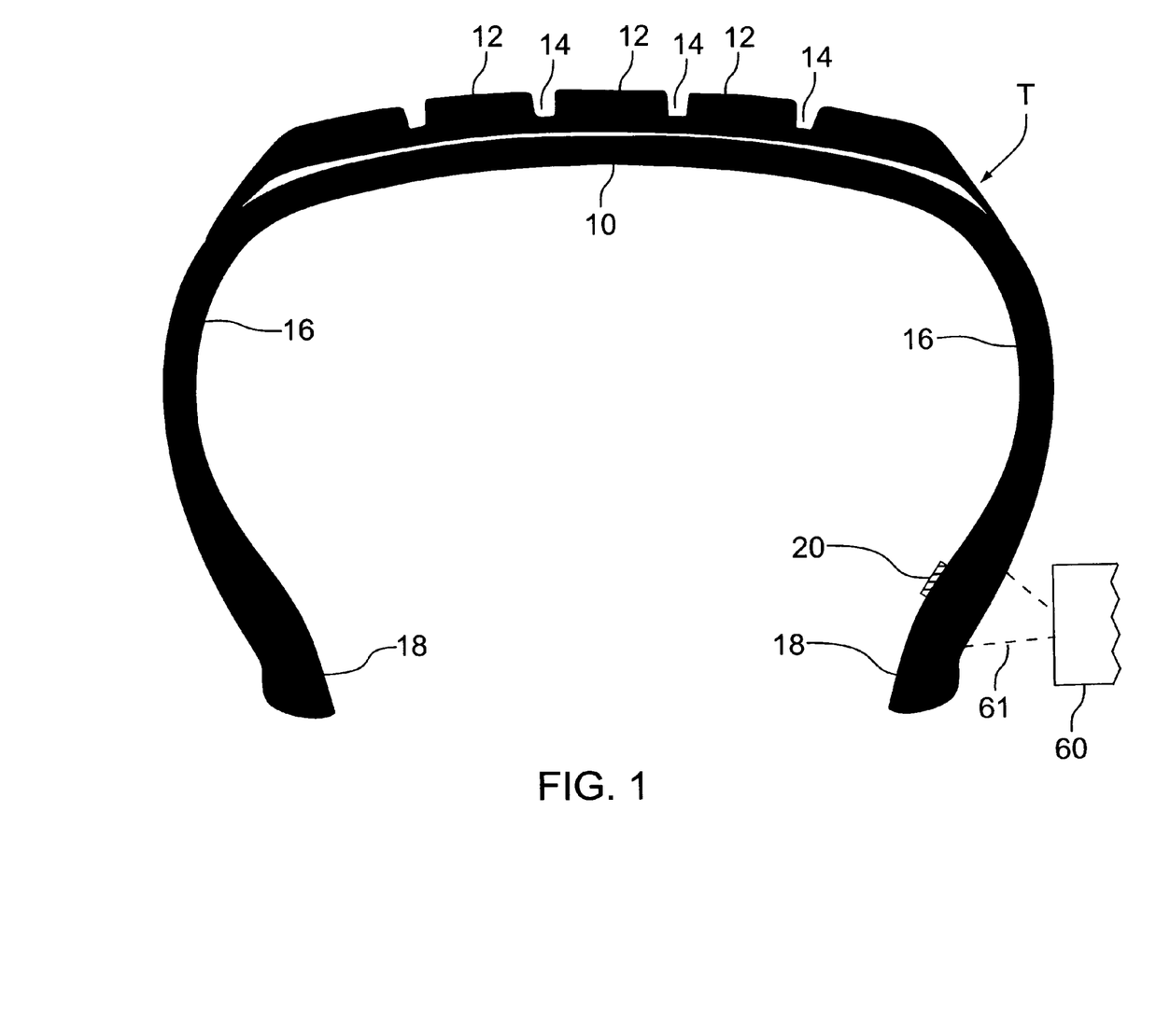
FIG. 1 is a cross-sectional view of a tire and the RFID tag/transponder of the present invention attached to or encased in the sidewall thereof.

Referring to FIG. 1, there is shown a tire T having a crown 10 with external threads 12 and grooves 14. In cross-section, the tire T has the crown 10 extending radially outwardly to a pair of oppositely disposed sidewalls 16 which define the maximum radial extent of the tire T. The sidewalls 16 curve inwardly from such maximum radial extent to a narrower area terminating at a pair of oppositely disposed beads 18.

As shown in FIG. 1, there is provided an RFID tag 20 of the present invention which is permanently imbedded in one of the sidewalls 16 in an area closer to the bead 18 than to the area of maximum radial extent of the sidewall 16. Although the selection of the precise location in the sidewall 16 for the RFID device 20 can be at any of a wide range of locations in the sidewall 16, it is important that once such location is established, that it remain the same for all subsequent production of the specific tire size and model. Thus, for a specific model and size tire, all RFID devices will be located at precisely the same location. It is also within the contemplation of the present invention that the RFID device 20 could be permanently secured to the interior surface of the sidewall 16, rather than embedded therein or on the rim or wheel to which the tire is affixed.

Figure 2A:
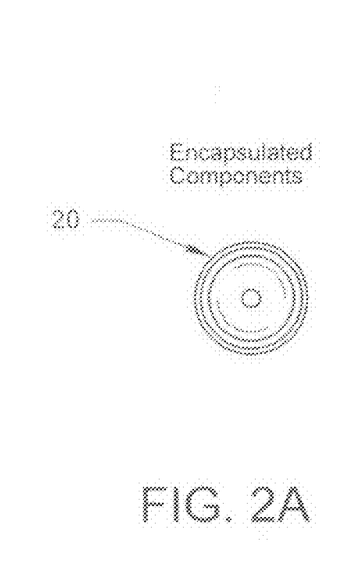
FIG. 2A is a front view of the RFID tag/transponder of the present invention.
Figure 2B:
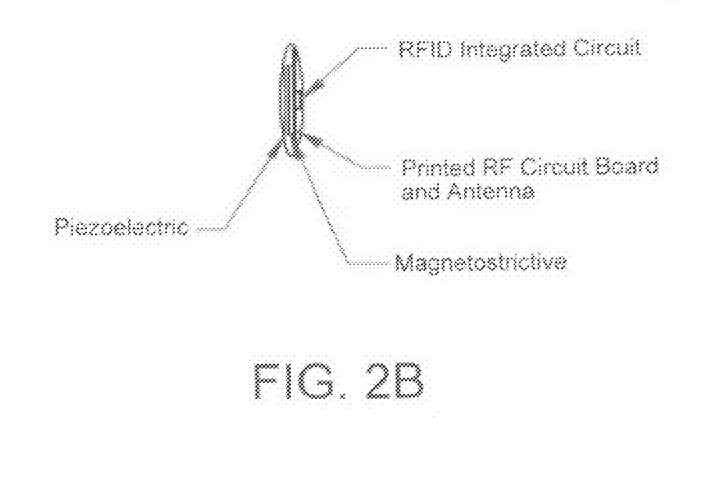
FIG. 2B is an edge view of the RFID tag/transponder of the present invention.
Figure 2C:
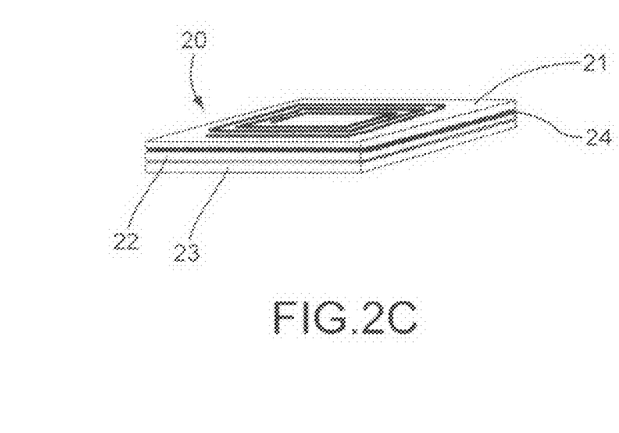
FIG. 2C is a perspective view of the RFID tag/transponder showing the joined piezoelectric material and magnetostrictive material.

Referring to FIGS. 2A, 2B and 2C, there is shown the construction of the RFID device 20 of the present invention. Its encapsulated components include a PC board 21 with an integrated circuit and antenna, join layers of magnetostrictive material 22 and piezoelectric material 23 adhered to the PC board 21 with a layer of flexible glue 24.

The RFID tag 20 can be turned off partially to save power. This involves disabling the long range portion of the tag. The gain stage in the receive portion is disabled and the long range transmitter is disabled. To re-enable the RFID device 20, one needs to get the RFID reader close enough to be detected by the sensor without the built-in gain stage. Turning off the tag completely will put the tag to sleep without any circuitry being enabled. To re-enable the tag from this state requires the user to get very close to cause the magnetostrictive—piezo of the RFID device 20 of the present invention to both wake up the circuit as well as power the circuitry.

The specific location of the RFID device for a given tire size or type may vary; however, once that location is determined for that specific tire size or type it is important that, during the manufacturing operation, it be positioned in precisely that location in each tire manufactured of that size or type.

The RFID tag 20 as installed in tires or other goods is programmed to contain extensive information about the tire or other goods including, in the case of a tire for example, the serial number, the date of manufacture, the name of the responsible operator, the size of the tire and such other information as is desired. The type and size of tire and date of manufacture make up what is known as a stock keeping unit (SKU).

The RFID device 20 mounted on tires T or other goods can be read and actuated to turn on and off by an external reader 60. The reader 60 generates an electromagnetic field 61 chopped up as magnetic pulses. RFID readers are widely available from a number of sources, such as, for example, Intermec Technologies Corporation, RFID EAS, Inc. and RFID Supply Chain.

As previously discussed, the RFID device 20 of the present invention has the ability to be turned on and off by an RFID reader. For example, prior to the tire being installed on an automobile or truck, it may be on in order to transmit information regarding its location in a warehouse, on a delivery truck to a dealer or at the dealer's facility. Once it is mounted on an automotive vehicle, the external reader 60 will cause it to shut off so that it does not transmit and, therefore, does not use up its stored energy. It can, however, be read by the external reader 60 which will power it during reading.

In contrast to prior art RFID devices which utilize a coil to generate voltage, the unique design of the present invention 22 has a magneto-restrictive sensor in combination with a layer of piezoelectric material 23. A coil will generate a small voltage, possibly only millivolts if the transponder is more than a few feet away from the reader. Under the present invention, which replaces the coil with a magneto-restrictive sensor 22 and piezoelectric material 23, many volts can be generated at extended ranges in the 10 s of feet. The piezoelectric material can be a crystal such as quartz or a plastic, composite or any other material having properties for generating electricity when stretched, flexed or displaced by magnetostrictive material.

Figure 3:
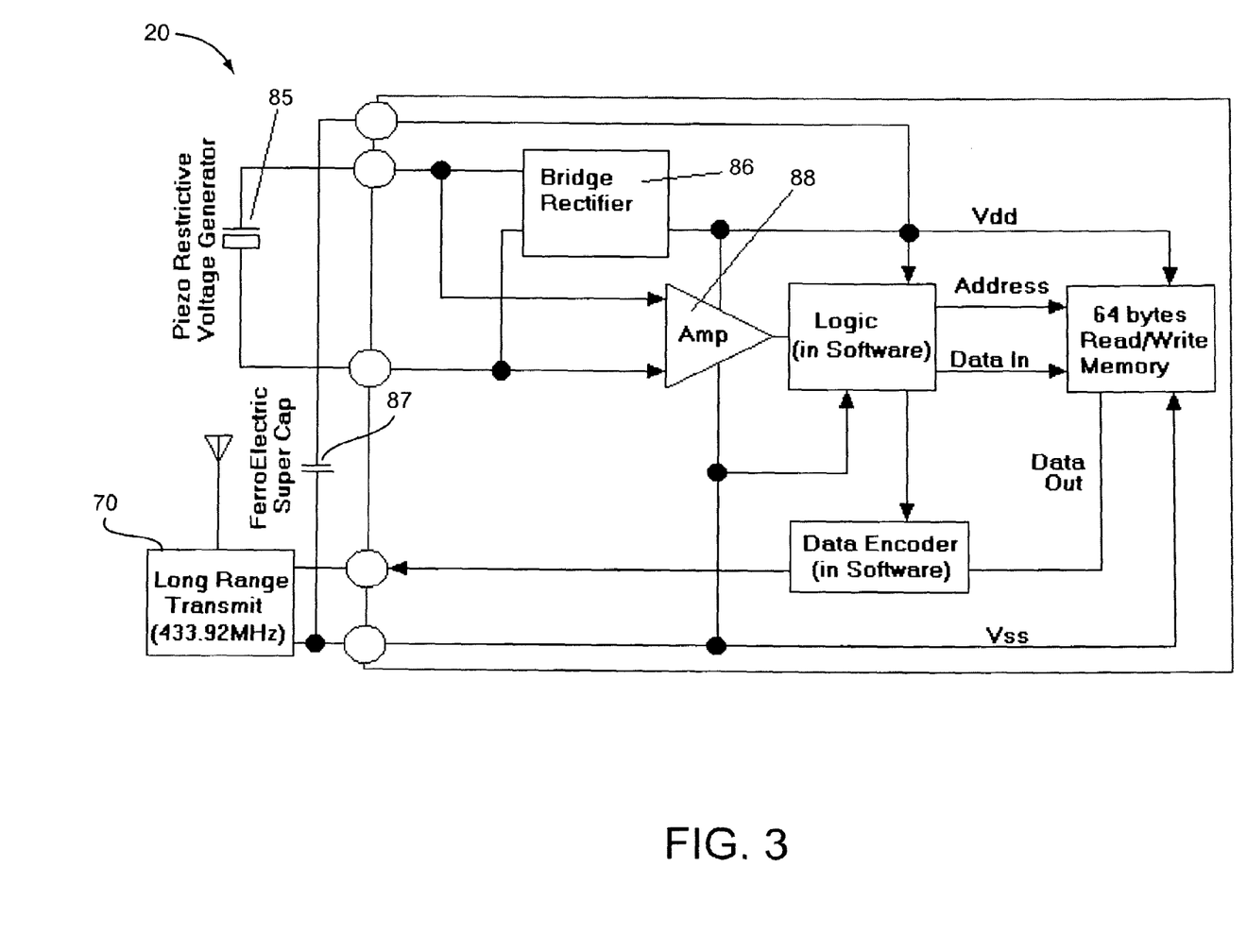
FIG. 3 is a block diagram of the various components of the RFID tag/transponder of the present invention.

FIG. 3 shows the RFID transponder/tag 20 with the necessary building blocks. Normally these building blocks are built in hardware but in this embodiment we will assume that these building blocks are created in software. Either a custom IC that has these building blocks in hardware or an off-the-shelf microprocessor can be used in this design.

Figure 4:
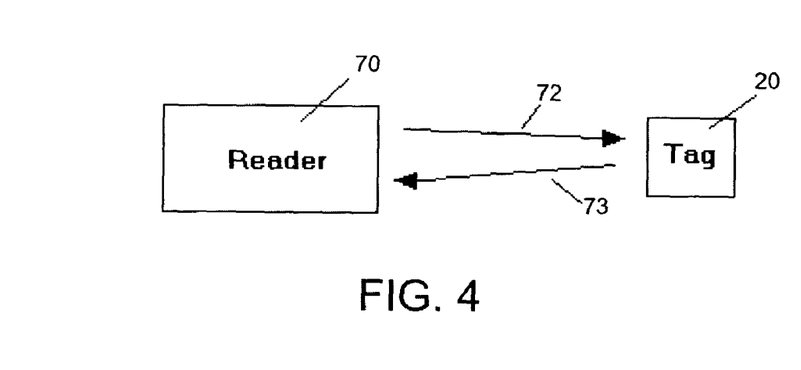
FIG. 4 is a block diagram showing a reader unit delivering power to the RFID tag/transponder.

FIG. 4 is a very simplistic block diagram showing a reader 70 sending out an electromagnetic carrier 72 that will power up the RFID tag/transponder 20. This carrier will cause the magneto-restrictive sensor 85 to generate enough voltage in the RFID tag/transponder 20 to power up. The RFID tag/transponder 20 will then send its ID No. and any other useful data 73 via a 433.92 MHz signal back to the reader 70.

Figure 5:
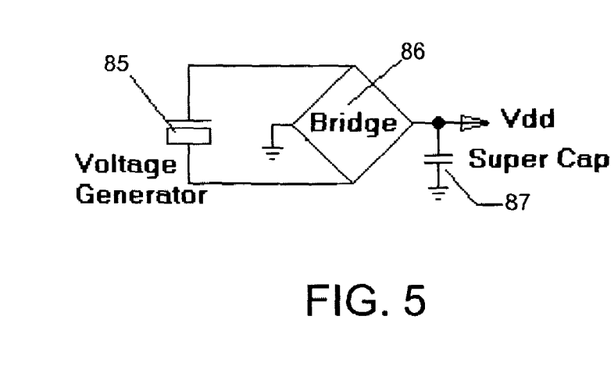
FIG. 5 shows a magneto-restrictive sensor generating voltage.

FIG. 5 shows how the magneto-restrictive sensor 85 will generate a voltage and send it to a full wave bridge 86 and then store the energy in a ferro-electric super cap 87.

Figure 6:
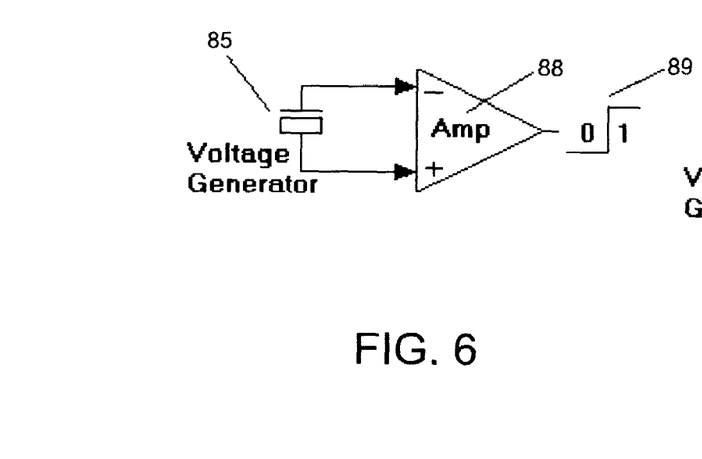
FIG. 6 shows the magneto-restrictive sensor tied to an amplifier.

FIG. 6 shows how the magneto-restrictive generator 85 is tied to an amplifier 88 where it will generate the necessary wake-up signal and clock signal 89 to run the RFID tag/transponder 20 when the transponder is very far from the reader and there is not enough energy to self power the tag. In this embodiment, the tag will operate for a while from the stored energy in the ferro-electric super cap, regular capacitor or small battery.

Figure 7:
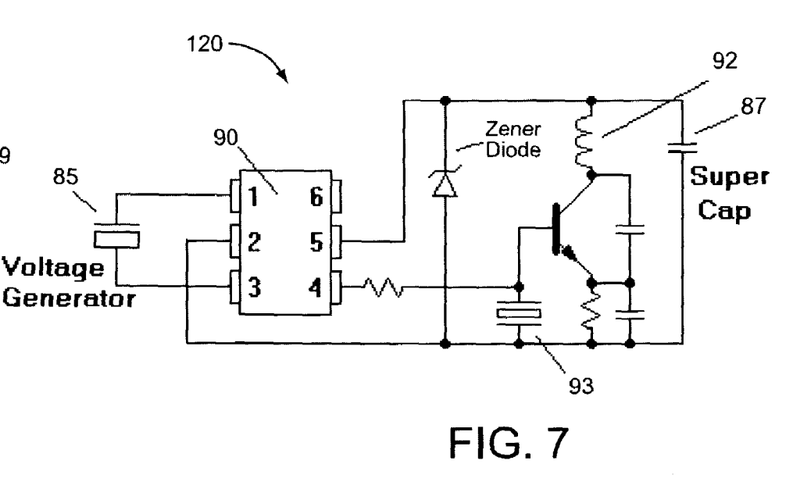
FIG. 7 shows a complete circuit for the RFID tag/transponder.

FIG. 7 illustrates how the complete circuit 120 for the RFID tag/transponder 20 can be built using a standard Microchip Company microprocessor 90, part number 12F629. The microprocessor 90 will manage all of the building blocks set forth above in software.

In FIG. 7 the magneto-restrictive generator 85 is connected to the comparator input (similar to the amplifier unit 88) of the microprocessor 90. This input can be switched between normal CMOS style inputs for normal range requirements and then programmed to be the comparator inputs to allow much greater range. It can do this by giving up the ability to charge up the ferro-electric capacitor 87. Ferro-electric material has a very high Q factor meaning that it has very low leakage and the ability to store energy more easily than typical capacitors. It is within the contemplation of the present invention to use the ferro-electric capacitor 87 as a small battery to operate the electronics in the RFID tags 20. Because the tag electronics require very little energy and the capacitor 87 has very low leakage and for its size, can store large amounts of energy, the RFID device 20 will operate for a long time using just the small ferro-electric capacitor (battery) 87.

The comparator is a circuit of the microprocessor 90 that is used to compare two signals. In a typical 5 volt system, lets assume that a reference voltage of 2.5 volts is applied to one input of the comparator and the other input is sensing a signal from an antenna. Whenever the antenna signal goes below the reference voltage, the output of the comparator is low. When the voltage goes above the reference, even by few millivolts, the output will go high. This circuit allows the designer to monitor very minor changes to a signal and see an output that swings the full 5 volts that is needed by the CMOS circuits around it. A typical comparator is the National Semiconductor LM-311.

The reading of memory, encoding of the memory's data and clocking out the data to the 433.92 MHz transmitter 70 is all done in software.

The transmitter 70 is a standard Colpitts oscillator and will self oscillate at a frequency controlled by a SAW resonator 93 similar to an RFM RO-2101C manufactured by RF Monolithics, Inc., Dallas, Tex. The antenna that will radiate the signal is the printed coil in the collector 92 of the transistor.

The protection diodes in the I/O ports that are connected to the magneto-restrictive generator 85 are naturally connected to ground and Vdd to create a bridge circuit that will send current out of the Vdd pin of the microprocessor 90. The ferro-electric cap 87 is wired to the Vss and Vdd pins.

This simple circuit set forth in FIG. 7 provides all of the necessary building blocks needed to create the complex circuit shown in FIG. 3 without having to design and fabricate a custom integrated circuit.

To reduce the manufacturing cost of the product, it is desirable to integrate as many parts of the design as possible. Under another embodiment, a 433 MHz oscillator may be integrated into the main IC.

Figure 8:
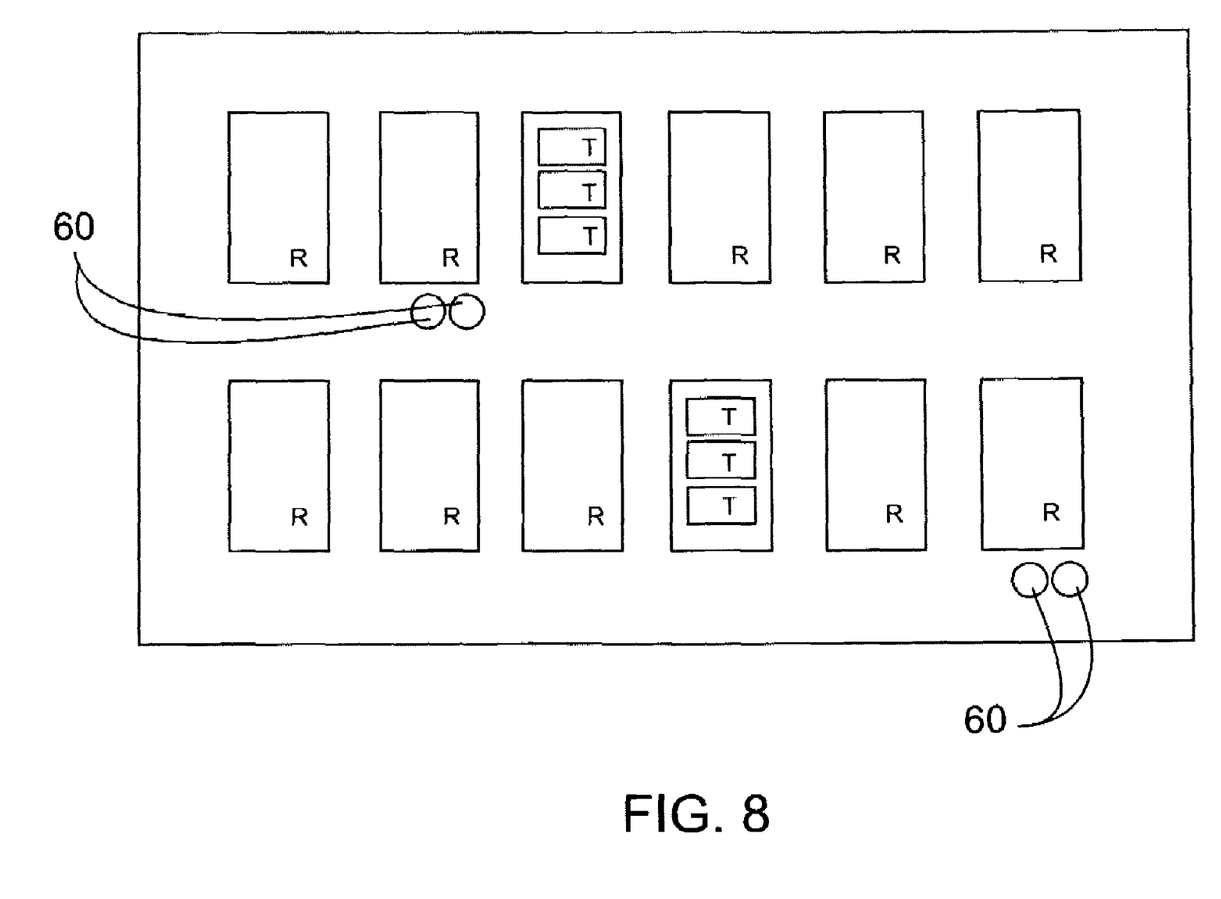
FIG. 8 is a view of a warehouse containing tires or other goods having the RFID tag/transponder attached thereto.

Referring to FIG. 8, there is shown a warehouse generally designated by the letter W having a series of racks R on which a plurality of goods such as the tires T may be stored. As previously mentioned, the RFID tags are capable of long-range transmission on the order of 30 feet. In order to monitor all tires in the warehouse W, a plurality of RFID readers 60 are positioned at various locations throughout the warehouse so that each of the tires T is located within 30 feet of a reader. This, therefore, provides the ability for the warehouse operator to determine the location and quantity of all tires having a specific SKU and to determine, by tire identification number, the location of a specific tire.

Trucks entering the warehouse with a load of tires equipped with the RFID tags of the present invention can be scanned as they enter the warehouse. Additionally, forklifts can be equipped with readers interfaced with computers to report the location at which the tires are stored in the warehouse.

A transponder device receives a carrier signal from a reader unit. This carrier signal is rectified by a rectifying circuit in order to generate operating power for the logic circuit. Logic and timing circuits receive their signal from the received carrier signal. Stored data from the transponder's internal memory is clocked out to the data encoder and sent out to the long-range transmitter.

We claim:

1. A radio frequency identification device (RFID) comprising in combination:
   (a) a piezoelectric crystal; and
   (b) a passive magnetic field sensor having magnetostrictive material, said sensor being responsive to a magnetic field to displace said piezoelectric crystals to thereby generate electricity.

2. A tire having a radio frequency identification device (RFID) mounted therein, said RFID adapted to receive, store and transmit data regarding said tire and its usage, said RFID comprising in combination:
   (a) a piezoelectric material; and
   (b) a passive magnetic field sensor having magnetostrictive material, said sensor being responsive to a magnetic field to displace said piezoelectric material to thereby generate electricity to power said RFID.

3. A tire according to claim 2 wherein said magnetic field is generated from a source external to said tire and received by said sensor.

4. A method for receiving, storing and transmitting data about an article comprising the steps of:
   (a) mounting on said article a radio frequency identification device (RFID) having in combination:
      (i) a piezoelectric material; and
      (ii) a passive magnetic field sensor having magnetostrictive material, said sensor being responsive to a magnetic field to displace said piezoelectric material to thereby generate electricity;
   (b) developing a magnetic field;
   (c) causing said magnetic field to activate said sensor thereby providing electric power to said RFID.

5. The method according to claim 4 wherein the step of developing a magnetic field includes activating an RFID reader and further including the steps of positioning said RFID reader at a location such that a magnetic field generated by said reader will cause said sensor to displace said piezoelectric material.

6. The method according to claim 5 further including the step of transmitting data to said RFID reader.

7. The method according to claim 4 wherein said RFID device includes a transmitter having the ability to be turned on and turned off and further including the steps of providing an RFID reader having the capability sending electromagnetic pulses, causing said RFID reader to send one or more electromagnetic pulses to said RFID device to turn on said RFID device.

8. The method according to claim 7 further including the step of encoding electromagnetic pulses sent to said RFID device to cause said RFID device to send data to said RFID reader at a specified time.

9. The method according to claim 7 further including the steps of:
   positioning a plurality of articles with RFID devices in diverse locations within range of said RFID reader;
   transmitting encoded electromagnetic pulses to turn on selective ones of said plurality of RFID devices.

10. The method according to claim 9 further including the step of causing different ones of said RFID devices to transmit data to said RFID reader at different time intervals.

* * * * *